(12) United States Patent
DuBois

(10) Patent No.: US 7,589,152 B2
(45) Date of Patent: Sep. 15, 2009

(54) ADHESIVE FORMULATIONS FOR NOVEL RADIAL (S-I/B)X POLYMERS

(75) Inventor: Donn A. DuBois, Houston, TX (US)

(73) Assignee: Kraton Polymers U.S. LLC, Houston, TX (US)

(*) Notice: Subject to any disclaimer, the term of this patent is extended or adjusted under 35 U.S.C. 154(b) by 967 days.

(21) Appl. No.: 11/010,906

(22) Filed: Dec. 13, 2004

(65) Prior Publication Data
US 2005/0137312 A1 Jun. 23, 2005

(51) Int. Cl.
| | |
|---|---|
| C08L 53/00 | (2006.01) |
| C08L 9/00 | (2006.01) |
| C08L 47/00 | (2006.01) |
| C08F 293/00 | (2006.01) |
| C08F 297/00 | (2006.01) |
| C08F 255/06 | (2006.01) |
| C08F 255/08 | (2006.01) |

(52) U.S. Cl. ............... 525/89; 525/98; 525/99; 525/280; 525/316; 525/320; 525/342

(58) Field of Classification Search .......... 525/89, 525/98, 99, 280, 316, 320, 342
See application file for complete search history.

(56) References Cited

U.S. PATENT DOCUMENTS

| | | | |
|---|---|---|---|
| 3,494,942 | A | 2/1970 | Miki et al. |
| RE27,145 | E | 6/1971 | Jones |
| 3,634,594 | A | 1/1972 | Hiyama |
| 3,670,054 | A | 6/1972 | De La Mare et al. |
| 3,700,633 | A | 10/1972 | Wald et al. |
| 3,985,830 | A | 10/1976 | Fetters et al. |
| 4,391,949 | A | 7/1983 | St. Clair |
| 4,444,953 | A | 4/1984 | St. Clair |
| 4,717,749 | A | 1/1988 | Tang et al. |
| 4,987,194 | A | 1/1991 | Maeda et al. |
| 5,057,571 | A | 10/1991 | Malcolm et al. |
| 5,143,961 | A | 9/1992 | Scholl et al. |
| 5,183,705 | A | 2/1993 | Birkholz et al. |
| 5,239,009 | A * | 8/1993 | Halasa et al. ............... 525/258 |
| 5,272,220 | A * | 12/1993 | Rodgers et al. ........... 525/332.3 |
| 5,278,232 | A | 1/1994 | Seelert et al. |
| 5,292,819 | A | 3/1994 | Diehl et al. |
| 5,372,870 | A | 12/1994 | Diehl et al. |
| 5,399,627 | A | 3/1995 | Diehl et al. |
| 5,474,875 | A | 12/1995 | Loerzer et al. |
| 5,532,319 | A * | 7/1996 | Asahara et al. ............... 525/89 |
| 5,552,493 | A | 9/1996 | Spence et al. |
| 5,618,882 | A | 4/1997 | Hammond et al. |
| 5,663,228 | A | 9/1997 | Sasaki et al. |
| 5,916,959 | A | 6/1999 | Lindquist et al. |
| 5,948,527 | A | 9/1999 | Gerard et al. |
| 5,948,594 | A | 9/1999 | Dudek et al. |
| 6,103,814 | A | 8/2000 | van Drongelen et al. |
| 6,136,921 | A | 10/2000 | Hsieh et al. |
| 6,380,305 | B1 | 4/2002 | Sheu |
| 6,833,411 | B2 | 12/2004 | Fujiwara et al. |
| 2002/0155903 | A1 | 10/2002 | Kato et al. |
| 2003/0232928 | A1 | 12/2003 | Atwood et al. |

FOREIGN PATENT DOCUMENTS

| | | |
|---|---|---|
| CA | 716645 | 8/1965 |
| CN | 1138055 | 9/1996 |
| CN | 1153183 | 7/1997 |
| DE | 29 42 128 A1 | 4/1981 |
| EP | 0 404 185 A2 | 12/1990 |
| EP | 0 298 319 B1 | 12/1992 |
| EP | 0 669 350 A1 | 8/1995 |
| EP | 0 545 181 B1 | 9/1995 |
| EP | 0 517 317 B1 | 1/1996 |
| EP | 0 745 635 A1 | 12/1996 |
| EP | 0 615 433 B1 | 3/1997 |
| EP | 0 802 251 A1 | 10/1997 |
| EP | 0 553 662 B1 | 10/1998 |
| EP | 1 103 577 A1 | 5/2001 |
| EP | 0 690 092 B1 | 10/2001 |
| EP | 0 878 504 B1 | 7/2002 |
| EP | 1 084 206 B1 | 7/2002 |
| EP | 0 826 380 B1 | 10/2002 |

(Continued)

OTHER PUBLICATIONS

K. Lee, et al. *Synthesis and Tensile Properties of Styrene-Butadiene-Isoprene Ternary Block Copolymer*; International Union of Pure Applied Chemistry; Jun. 30-Jul. 4, 2003. p. O48.

*Primary Examiner*—Nathan M Nutter
(74) *Attorney, Agent, or Firm*—Donna B. Holguin; Gregory N. Clements

(57) ABSTRACT

The invention relates to an adhesive composition comprising (i) one or more styrenic block copolymer compositions, (ii) a tackifier resin, and (iii) one or more plasticizers, wherein said styrenic block copolymer composition comprises: a. a tetra-branched block copolymer (IV) represented by the general formula $(A-B)_4X$; b. a tri-branched block copolymer (III) represented by the general formula $(A-B)_3X$; c. a di-branched block copolymer (II) represented by the general formula $(A-B)_2X$; and d. a linear diblock copolymer (I) represented by the general formula A-B; where: i. A represents a polymer block of a mono alkenyl arene; ii. B represents a polymer block of a mixture of isoprene and 1,3-butadiene in a weight ratio of isoprene to butadiene from about 70:30 to about 40:60; iii. X represents the residue of a multi-functional coupling agent; iv. the weight percent of A blocks is from about 14% to about 22%; v. the relative amounts of copolymers IV, III, II, and I are from 0 to 20 weight percent IV, from 50 to 80 weight percent III, from 0 to 20 weight percent II and from 20 to 50 weight percent I, where the total of I, II, III and IV equals 100 weight percent; and vi. the melt flow rate of the polymer composition is at least 2.0 g/10 minutes at 200° C./5 kg as measured by ASTM D1238 (D condition).

16 Claims, No Drawings

FOREIGN PATENT DOCUMENTS

| | | |
|---|---|---|
| EP | 0 833 207 B1 | 11/2002 |
| EP | 1 426 411 A1 | 6/2004 |
| EP | 1 431 349 A1 | 6/2004 |
| EP | 1 481 996 A1 | 12/2004 |
| EP | 1 493 790 A1 | 1/2005 |
| JP | 02-102212 | 4/1990 |
| JP | 05-070699 | 3/1993 |
| JP | 05-112726 | 5/1993 |
| JP | 05-163444 | 6/1993 |
| JP | 05-345885 | 12/1993 |
| JP | 07238207 | 9/1995 |
| JP | 2000-239635 | 9/2000 |
| JP | 2001-100396 | 4/2001 |
| JP | 2001-100397 | 4/2001 |
| JP | 2002265748 | 9/2002 |
| JP | 2004-131707 | 4/2004 |
| WO | 92/20725 | 11/1992 |
| WO | 95/14727 | 6/1995 |
| WO | 00/14170 | 3/2000 |
| WO | 02/57386 | 7/2002 |
| WO | 02/057386 A2 | 7/2002 |
| WO | 03/102032 | 12/2003 |
| WO | 2004/097523 | 11/2004 |

\* cited by examiner

ADHESIVE FORMULATIONS FOR NOVEL RADIAL (S-I/B)X POLYMERS

BACKGROUND OF THE INVENTION

1. Field of the Invention

The present invention relates to a polymer composition which contains a mixture of uncoupled polymers and radial coupled polymers, wherein the rubbery mid block is an isoprene/butadiene block. The invention also relates to adhesive compositions which contain the particular polymer composition.

2. Background of the Art

Adhesive compositions based on styrenic block copolymers as thermoplastic elastomeric components are well known in the art. These compositions are used for instance as PSA (pressure sensitive adhesive) for industrial tapes, packaging tapes and labels, and in multipurpose hot-melt adhesive compositions which may be used to bond or construct articles in the manufacture of disposable soft goods, such as diapers, feminine care articles, surgical drapes and the like.

Styrene-isoprene-styrene block copolymers (S-I-S) and styrene-butadiene-styrene block copolymers (S-B-S) are widely used in these adhesive compositions. Both classes of block copolymers give the adhesive compositions specific properties related to the respective inherent characteristics of these block copolymers. For example, the softness of S-I-S makes this polymer the material of choice for pressure sensitive applications in tapes and labels. Alternatively, the elevated cohesion of S-B-S makes this material attractive for construction adhesives for disposable soft goods.

When compounded into hot melt adhesives S-I-S polymers degrade by a chain scission mechanism; molecular weight is reduced and the cohesive strength of the adhesive is lowered. S-B-S polymers on the other hand tend to degrade by further chemical cross-linking increasing the cohesive strength of the adhesive, but also increasing the elastic modulus, forming a too hard and non-tacky adhesive. The thermal decomposition of both S-I-S and S-B-S based adhesives can ruin the utility of the adhesive product. It would be an advantage if polymers with less tendency to either fall apart (scission) or cross-link would be developed.

In WO 02/057386 A2, an adhesive composition is described comprising (i) one or more styrenic block copolymers, (ii) a tackifier resin, and (iii) one or more plasticizers, wherein the styrenic block copolymers is of the general structure $$A-C-A \qquad (1),$$

or $$(A-C)_n-X \qquad (2),$$

wherein each A independently is a polymer block of an aromatic vinyl compound, and C is a mixed polymer block (B/I) of butadiene (B) and isoprene (I) in a weight ratio B:I in the range of 30:70 to 70:30, and said polymer block C has a glass transition temperature ($T_g$) of at most −50° C. (determined according to ASTM E-1356-98), n is an integer equal to or greater than 2, and X is the residue of a coupling agent, and wherein the tackifier resin is an aromatic hydrocarbon resin.

While the adhesive compositions of the '386 published patent application are an improvement over prior compositions, there still exists a need for a mixed mid-block copolymer that has a radial structure yet still features low melt viscosity and good shear properties. We have found that an unexpectedly good balance of viscosity and shear can be realized in radial compositions that contain high amounts of diblock.

SUMMARY OF THE INVENTION

The present invention broadly encompasses a predominately radial block copolymer having an isoprene/butadiene midblock and a specific amount of diblock component. In particular, the present invention includes a block copolymer composition comprising:

a. a tetra-branched block copolymer (IV) represented by the general formula $(A-B)_4X$;
b. a tri-branched block copolymer (III) represented by the general formula $(A-B)_3X$;
c. a di-branched block copolymer (II) represented by the general formula $(A-B)_2X$; and
d. a linear diblock copolymer (I) represented by the general formula A-B;

wherein A represents a polymer block of a mono alkenyl arene; B represents a polymer block of a mixture of isoprene and 1,3-butadiene in a weight ratio of isoprene to butadiene from about 70:30 and 40:60; X represents the residue of a multi-functional coupling agent; the weight percent of A blocks is between about 14% and about 22%; the relative amounts of copolymers IV, III, II, and I are from 0 to 20 weight percent IV, from 50 to 80 weight percent III, from 0 to 20 weight percent II and from 20 to 50 weight percent I, wherein the total of I, II, III and IV equals 100 weight percent; and the melt flow rate of the polymer composition is at least 2.0 g/10 minutes at 200° C./5 kg as measured by ASTM D-1238 (condition D), preferably greater than or equal to 5.0 g/10 min.

One advantage of the polymers of the present invention is that they combine the strength of the traditional single diene polymers with the melt stability of the mixed diene polymers. More importantly, however, the polymers of the present invention allow the synthesis of radial mixed I/B midblock polymers with fundamentally superior properties compared to linear mixed I/B midblock polymers.

Also claimed are adhesive compositions containing the polymer composition, a particular tackifying resin, and optional plasticizers. Such compositions provide lower viscosity and improved adhesion (especially shear) properties compared to formulations of the prior art.

DETAILED DESCRIPTION OF THE PREFERRED EMBODIMENTS

In one embodiment, the present invention is a process which includes a step of reacting a living lithium-terminated polymer having the formula P—Li wherein P is a copolymer chain containing one block of a random isoprene/1,3-butadiene copolymer and one block of a mono alkenyl arene having 8 to 18 carbon atoms with the multi functional coupling agent. As used in the claims and specification, the term "butadiene" refers to 1,3-butadiene.

Suitable mono alkenyl arenes useful with the process of the present invention include, but are not limited to, styrene, o-methylstyrene, p-methylstyrene, p-tert-butylstyrene, 2,4-dimethylstyrene, a-methylstyrene, vinyinaphthalene, vinyltoluene, vinylxylene, 1,1-diphenylethylene, and mixtures thereof. Preferred are styrene, alpha-methylstyrene and para-methylstyrene, with styrene being the most preferred. For the purposes of the present invention, a styrenic block copolymer is any block copolymer polymer prepared with a suitable vinyl aromatic compound.

The polymer chains P are block copolymers of butadiene/isoprene monomers and mono alkenyl aromatic monomers. The preferred monomers are isoprene, 1,3-butadiene and styrene. The presently preferred polymer chains P are those where the conjugated dienes are present in a major amount and the mono vinyl-substituted arenes are present in a minor amount. It is preferred that the mono alkenyl arene content be from about 14 to about 22 weight percent of the total block copolymer, more preferably from about 15 to about 21 weight percent of the total block copolymer.

In those polymers in which the polymer chain P has a structure A-B—, B is attached to the coupling agent, and A represents a block of mono alkenyl arenes, preferably a polystyrene block, and B represents a block that confers rubbery properties to the polymer chain, such as a poly conjugated diene block—i.e. a block of isoprene and butadiene. Such a polymer exhibits properties both of an elastomer and of a thermoplastic polymer. Therefore, such polymers can be formed into articles by standard procedures known for producing such articles from thermoplastic polymers while the finished article exhibits elastomeric properties.

Furthermore, specific polymers constituting preferred embodiments of the present invention are those obtained by reactions and procedures disclosed in detail in the following description of a process to make these polymers.

In accordance with another embodiment of this invention, there is provided a process for making the polymers defined herein which process comprises a coupling reaction between a living polymer having the formula P—Li and a multi functional coupling agent, wherein Li is lithium and P is as described hereinbefore.

The quantity of coupling agent employed with respect to the quantity of living polymers P—Li present depends largely upon the degree of coupling and the properties of the coupled polymers desired. Preferably, the coupling agent defined above will be employed in a range of from about ½ to about ⅕ equivalents of coupling agent per mole of lithium metal, more preferably from about ⅓ to about ¼ equivalents of coupling agent based upon the moles of lithium metal present in the polymer.

As stated above, the coupling agent used in the present invention is a multifunctional coupling agent, which means a coupling agent that is capable of preparing a polymer with three or more arms radiating from the coupling agent residue. Such coupling agents include but are not limited to, for example, silicon halides, siloxanes, alkoxysilanes, epoxy alkoxysilanes, esters of monohydric alcohols with carboxylic acids, epoxidized oils such as epoxidized soy bean oil, epoxides and divinylaromatics. Preferred coupling agents are glycidoxy propyl trimethoxy silane (GPTS) and tetramethoxysilane. Star-shaped polymers are prepared with polyalkenyl coupling agents as disclosed in, for example, U.S. Pat. No. 3,985,830; U.S. Pat. No. 4,391,949; and U.S. Pat. No. 4,444,953; and Canadian Pat. No. 716,645. A suitable polyalkenyl coupling agent includes divinylbenzene, preferably m-divinylbenzene.

The temperature at which the coupling reaction is carried out can vary over a broad range and, for convenience, often is the same as the temperature of polymerization. Although the temperature can vary broadly from about 0° to about 150° C., it will preferably be from about 30° C. to 100° C., more preferably from about 55° C. to about 80° C.

The coupling reaction is normally carried out by simply mixing the coupling agent, neat or in solution, with the living polymer solution. The reaction period is usually quite short, and can be affected by the mixing rate in the reactor. The normal duration of the coupling reaction will be in the range of 1 minute to 1 hour. Longer coupling periods may be required at lower temperatures.

After the coupling reaction, the linked polymers may be recovered, or if desired they may be subjected to a selective hydrogenation of the diene portions of the polymer. Hydrogenation generally improves thermal stability, ultraviolet light stability, oxidative stability, and weatherability of the final polymer. It is important that the coupling agents not interfere with or otherwise "poison" the hydrogenation catalyst.

Hydrogenation can be carried out via any of the several hydrogenation or selective hydrogenation processes known in the art. For example, such hydrogenation has been accomplished using methods such as those taught in, for example, U.S. Pat. No.3,494,942; U.S. Pat. No.3,634,594; U.S. Pat. No. 3,670,054; U.S. Pat. No. 3,700,633; and U.S. Re. 27,145. These methods operate to hydrogenate polymers containing aromatic or ethylenic unsaturation, and are based upon operation of a suitable catalyst. Such catalyst, or catalyst precursor, preferably comprises a Group VIII metal such as nickel or cobalt which is combined with a suitable reducing agent such as an aluminum alkyl or hydride of a metal selected from Groups I-A, II-A and III-B of the Periodic Table of the Elements, particularly lithium, magnesium or aluminum. This preparation can be accomplished in a suitable solvent or diluent at a temperature from about 20° C. to about 60° C. Other catalysts that are useful include titanium based catalyst systems and various heterogeneous catalysts.

Hydrogenation can be carried out under such conditions that at least about 90 percent of the conjugated diene double bonds have been reduced, and between zero and 10 percent of the arene double bonds have been reduced. Preferred ranges are at least about 95 percent of the conjugated diene double bonds have been reduced, and more preferably about 98 percent of the conjugated diene double bonds are reduced. Alternatively, it is possible to hydrogenate the polymer such that aromatic unsaturation is also reduced beyond the 10 percent level mentioned above. In that case, the double bonds of both the conjugated diene and arene may be reduced by 90 percent or more.

After hydrogenation the hydrogenated polymers may be cleaned up by standard techniques, such as addition of aqueous acid solutions to remove the residues of the polymerization initiator and hydrogenation catalyst. It is usually preferred to add an antioxidant to the reaction mixture before isolation of polymer.

The polymer is separated from the reaction mixture by standard techniques, such as steam stripping or coagulation with a suitable non-solvent such as an alcohol or water. The coagulated or stripped polymer is then removed from the resulting medium by, e.g., countercurrent flow through a cyclone, centrifugation or extrusion. Residual solvent and other volatiles can be removed from the isolated polymer by heating, optionally under reduced pressure or in a forced airflow.

In accordance with a further embodiment of this invention, there is provided a process for producing the polymers as defined above. This process includes basically three steps. The first step is the step in which a living polymer having the formula P—Li is produced. The second step is that in which this living polymer is coupled with the coupling agent of this invention as defined above. The third step, which is optional, is a hydrogenation step.

The first step of this process is carried out by reacting a mono-functional lithium initiator system with the respective monomer or monomers to form the living polymer chain P—Li. This polymerization step is typically carried out in a sequence of steps. In this case the mono alkenyl arene (e.g. styrene) is polymerized first, followed by the mixture of isoprene and butadiene.

The lithium-based initiator systems used in the first step of the process to make the coupled polymers of this invention are based on lithium having the general formula R'Li wherein R' is a hydrocarbyl radical of 1 to about 20 carbon atoms. Examples of such lithium initiators are methyllithium, isopropyllithium, n-butyllithium, sec-butyllithium, t-octyllithium, n-dodecyllithium, n-eicosyllithium, phenyllithium, naphthyllithium, p-tolyllithium, 4-phenylbutyllithium, cyclohexyllithium, and 4-cyclohexyllithium. The amount of the lithium metal initiator employed depends upon the desired properties of the polymer, particularly the desired molecular weight. Normally, the organomonolithium initiator is employed in the range of from about 0.1 to about 100 gram millimoles per 100 grams of total monomers.

The polymerization reaction is carried out in the presence of a hydrocarbon diluent. Preferably the hydrocarbon diluent is a paraffinic, cycloparaffinic or aromatic hydrocarbon having from 4 to 10 carbon atoms or a mixture of such diluents. Examples for the diluent are n-hexane, n-heptane, 2,2,4-trimethylpentane, cyclohexane, cyclopentane, isopentane, benzene and toluene. The reaction is generally carried out with a weight ratio of diluent to monomers exceeding 1. Preferably the diluent is employed in a quantity of from about 400 to about 1500 parts by weight per 100 parts by weight of total monomers.

It is also important to control the molecular weight of the various blocks. Regarding the AB block copolymer composition, each A block has a weight average molecular weight from about 5,000 to about 17,000, preferably from about 7,000 to about 14,000, and even more preferably from about 9,000 to about 13,000. Each uncoupled B block has a weight average molecular weight from about 50,000 to about 100,000, preferably from about 60,000 to about 90,000, and even more preferably from about 65,000 to about 85,000. These molecular weights are most accurately determined by light scattering measurements, and are expressed as number average molecular weights.

It is also important to control the microstructure or vinyl content of the conjugated diene in the B blocks. The term "vinyl" has been used to describe the polymer product that is made when 1,3-butadiene is polymerized via a 1,2-addition mechanism. The result is a monosubstituted olefin group pendant to the polymer backbone, a vinyl group. In the case of anionic polymerization of isoprene, insertion of the isoprene via a 3,4-addition mechanism affords a geminal dialkyl C═C moiety pendant to the polymer backbone. The effects of 3,4-addition polymerization of isoprene on the final properties of the block copolymer will be similar to those from 1,2-addition of butadiene. When referring to the use of butadiene as the conjugated diene, it is preferred that about 1 to 80 mol percent of the condensed butadiene units in the block have 1,2-vinyl configuration. Preferably, from about 4 to about 60 mol percent of the condensed butadiene units should have 1,2 configuration. When referring to the use of isoprene as the conjugate diene, it is preferred that about 4 to 60 mol percent of the condensed isoprene units in the block have 3,4-vinyl configuration. This is effectively controlled by addition of an ether, such as diethyl ether, or a diether, such as 1,2-diethoxypropane, or an amine as a microstructure modifier to the diluent. Suitable ratios of microstructure modifier to lithium are disclosed and taught in U.S. Re. 27,145. The polymers of this invention can be made without any microstructure modifier, thus the vinyl content will be in the low end of the aforementioned range.

It is important to control the ratio of isoprene to butadiene in order to mitigate thermal cross-linking and control raw material costs. Moreover, too much butadiene can diminish adhesive properties. The weight ratio of isoprene to butadiene is from about 70:30 to about 40:60, preferably from about 60:40 to about 50:50.

The polymerization reaction in step 1 usually occurs within a period of time ranging from a few minutes up to about 6 hours. Preferably, the reaction is carried out within a time period of from about 10 minutes to about 2 hours. The polymerization temperature is not critical and will generally be in the range of from about 30° C. to about 100° C., preferably in the range of from about 55° C. to about 75° C.

At the conclusion of the polymerization, in order to carry out the second or coupling step, the polymerization mixture is blended with the coupling agent. This is done before any material that would terminate the polymerization reaction and that would remove the lithium metal atom from the polymer chain is added to the reaction mixture. Thus the blending of the polymerization mixture and the coupling agent is carried out before any material such as water, acid, or alcohol is added to inactivate the living polymer. The second step of coupling the living polymer is thus carried out as described in detail above. The third step is the hydrogenation, which is also described in detail above.

The relative amounts of the tetra-branched (IV), tri-branched (III), di-branched (II) and linear diblock (I)species are: 0 to 20 weight percent tetra-branched IV, 50 to 80 weight percent tri-branched III, 0 to 20 weight percent di-branched II and 20 to 50 weight percent linear diblock I. Preferred amounts are: 1 to 15 weight percent IV, 50 to 70 weight percent III, 1 to 10 weight percent II and 30 to 50 weight percent I.

The block copolymer composition has a Coupling Efficiency ("CE") of about 40 to 80 weight percent, preferably about 55 to about 75% weight percent. Coupling Efficiency is defined as the proportion of polymer chain ends which were living, P—Li, at the time the coupling agent was added that are linked via the residue of the coupling agent at the completion of the coupling reaction. In practice, Gel Permeation Chromatography (GPC) data is used to calculate the coupling efficiency for a polymer product. The sum of the areas under the GPC curve for all of the coupled species (II+III+IV) is divided by the sum of the areas under the GPC curve for all of the coupled moieties plus the area under the curve for the starting, uncoupled polymerspecies (I+II+III+IV). This ratio is multiplied by 100 to convert the coupling efficiency to a percentage value.

The percentage of mono alkenyl blocks (i.e., A blocks in the AB copolymer) in the block copolymer composition is desired to be from about 14 to about 22 weight percent, preferably from about 15 to about 21 weight percent.

Various materials are known to be detrimental to the lithium-initiated polymerization. Particularly, the presence of carbon dioxide, oxygen, water and alcohols should be avoided during an organomonolithium-initiated polymerization reaction of step 1 of this combined process for making the coupled polymers. Therefore, it is generally preferred that the reactants, initiators, and the equipment be free of these materials and that the reaction is carried out under an inert gas such as nitrogen.

The present invention also includes adhesive compositions comprising the radial polymer composition, a tackifier, and an optional platicizer. Suitable hydrocarbon resins used as tackifiers are those having a relative percentage of aromaticity (based on aromatic protons relative to the total number of protons in the molecule as determined by H—NMR) in the range of from about 3 to about 18%, preferably in the range of from about 4 to about 14%.

Suitable tackifier resins may be selected from the type generally referred to as mixed aliphatic/aromatic resins or so-called heat reactive hydrocarbon resins. These hydrocarbon resins have a mixed aromatic and aliphatic composition. The streams used to produce these resins contain C-9 components (indene and styrene) and various other C-5 monomers or C-5 dimers.

Examples of suitable mixed aliphatic/aromatic resins and heat reactive hydrocarbons include, but are not limited to, ESCOREZ® 2101 and ESCOREZ® ECR-373 (Exxon Chemicals); WINGTACK® ET and WINGTACK® 86 (Goodyear Chemicals); PICCOTAC® 8095, and HERCO-TAC® 205 (Eastman); and QUINTONE® S-100 (Zeon). The preferred tackifier resin is WINGTACK® ET, in particular as it's color is very light pale.

The composition according to the present invention preferably comprises from about 50 to about 400 parts by weight, more preferably from about 100 to about 300 parts by weight of a tackifier, per hundred parts by weight rubber (phr).

Suitable plasticizers include plasticizing oils such as low aromatic content hydrocarbon oils that are paraffinic or naphthenic in character (carbon aromatic distribution ≦5%, preferably ≦2%, more preferably 0% as determined according to DIN 51378). Those products are commercially available from the Royal Dutch/Shell Group of companies, like SHELLFLEX®, CATENEX®, and ONDINA® oils. Other oils include KAYDOL® oil from Witco, or TUFFLO® oils from Arco. Other plasticizers include compatible liquid tackifying resins like REGALREZ® R-1018.

Other plasticizers may also be added, such as olefin oligomers; low molecular weight polymers (≦30,000 g/mol) such as liquid polybutene, liquid polyisoprene copolymers, liquid styrene/isoprene copolymers or liquid hydrogenated styrene/conjugated diene copolymers; vegetable oils and their derivatives; or paraffin and microcrystalline waxes.

The composition according to the present invention may, but need not, contain a plasticizer. If it does, then the composition comprises up to about 200 parts by weight, preferably from about 5 to about 150 parts by weight, more preferably from about 10 to about 130 parts by weight of a plasticizer. Indeed, each block copolymer (i) may be pre-blended with a small amount of plasticizer by the manufacturer of said copolymer.

Other rubber components may be incorporated into the adhesive compositions according to the present invention. It is also known in the art that various other components can be added to modify the tack, the odor, the color of the adhesives. Antioxidants and other stabilizing ingredients can also be added to protect the adhesive from degradation induced by heat, light and processing or during storage.

Several types of antioxidants can be used, either primary antioxidants like hindered phenols or secondary antioxidants like phosphite derivatives or blends thereof. Examples of commercially available antioxidants are IRGANOX® 565 from Ciba-Geigy (2.4-bis-(n-octylthio)-6-(4-hydroxy-3,5-di-tertiary-butyl anilino)-1,3,5-triazine), IRGANOX® 1010 from Ciba-Geigy (tetrakis-ethylene-(3,5-di-tertiary-butyl-4-hydroxy-hydrocinnamate)methane) and POLYGARD® HR from Uniroyal (tris-(2,4-di-tertiary-butyl-phenyl)phosphite). Other antioxidants developed to protect the gelling of the polybutadiene segments can also be use, like the SUMILIZER® GS from Sumitomo (2[1-(2-hydroxy-3,5-di-ter-pentylphenyl)ethyl)]-4,6-di-tert-pentylphenylacrylate); SUMILIZER® T-PD from Sumitomo (pentaerythrythyltet-rakis(3-dodecylthiopropionate)); or mixtures thereof.

No particular limitation is imposed on the preparation process of the adhesive composition. Therefore, there may be used any process such as a mechanically mixing process making use of rolls, a Banbury mixer or a Dalton kneader, a hot-melt process characterized in that heating and mixing are conducted by using a melting kettle equipped with a stirrer, like a high shear Z-blade mixer or a single- or twin-screw extruder, or a solvent process in which the compounding components are poured in a suitable solvent and stirred, thereby obtaining an intimate solution of the pressure sensitive adhesive composition.

PSA compositions according to the present invention may be applied without using any solvent (e.g., hot-melt) or in the form of their solutions to a base material such as paper or a plastic film by means of a proper coater, thereby producing various kinds of pressure sensitive adhesive tapes or sheets. It may also be used as an adhesive or a sealant without applying to a base material.

Indeed, the block copolymers according to the present invention are excellent in heat stability. Therefore, the present adhesion compositions are particularly useful, with good flowability at elevated temperatures, as a hot-melt type pressure sensitive adhesive composition.

During label manufacture, a laminate of a face stock, pressure sensitive adhesive layer and a release liner is passed through an apparatus which converts the laminate into commercially useful labels and label stock. The process involves, among others, die-cutting and matrix stripping to leave labels on a release liner. From U.S. Pat. No. 5,663,228 it is known that good convertibility may be achieved, using blends of S-I-S and S-B or S-B-S block copolymers. The same convertibility may be achieved with the block copolymers of the present invention.

Moreover, the block copolymer with mixed midblock may find additional uses. For example, these mixed polydiene midblock copolymers may be used in Road Marking Paint (RMP) formulations applied on roads as coating, strips and marking signs to improve the traffic safety. RMP's usually consist of a binder (hydrocarbon resins, polymers, plasticisers) and fillers (pigments, mineral fillers and reflective glass beads). The role of the block copolymer in the binder is to provide strength, flexibility, creep resistance but also low temperature properties. The present block copolymers significantly improve the low temperature properties of such RMP's.

EXAMPLES

The following examples are provided to illustrate the present invention. The examples are not intended to limit the scope of the present invention and they should not be so interpreted. Amounts are in weight parts or weight percentages unless otherwise indicated.

Example 1

Previous work has shown that four critical molecular parameters exist in designing processable, mixed-midblock polymers. These are styrene block molecular weight, total molecular weight, coupling efficiency and I/B ratio.

Compared to linear block copolymers, radial analogs have better shear stability, higher yield-stress and higher tensile strength. Tape producers claim that they also have the advantage of improved "melt strength" and this facilitates uniform coating at very low coating weights. On the negative side, branched molecules can be prone to crosslinking.

A series of polymers, using glycidoxy propyl trimethoxy silane (GPTS) as the coupling agent were prepared. Isoprene and 1,3-butadiene were co-charged without any additives to modify kinetics or microstructure. The polymers were neutralized by sparging with $CO_2$ prior to the addition of 0.2 wt % IRGANOX® 565 antioxidant. Table 1 shows the various polymers that were used in this first Example. Only Polymers #2 and #5 are according to the present invention.

The data in Table 1 suggests that coupling efficiency and I/B ratio must be carefully selected to avoid excessive viscosity. Two candidate polymers, #1 and #4 cross-linked in the Melt Flow tubes. Both of these polymers had at least 50% BD and higher than desired coupling efficiency (the target was 70%).

TABLE 1

Molecular Parameters of GPTS-coupled (SI)₃ Polymers

| | Polymer Number | | | | |
|---|---|---|---|---|---|
| | #1 | #2 | #3 | #4 | #5 |
| Polystyrene Content | 18.13 | 19.2 | 18.81 | 18.54 | 15.50 |
| Monomer Blend Target I/B | 50/50 | 70/30 | 70/30 | 30/70 | 60/40 |
| Actual Coupling % | 75.8 | 63.2 | 74 | 74.9 | 71 |
| PS Block Mn (g/mol) | 10,350 | 11,370 | 11,430 | 11,350 | 8,145 |
| Step II Pk | 90,780 | 95,990 | 99,010 | 107,400 | 60,660 |
| Melt Index (200 C./5 kg) | Cross-linked | 7 | 2 | Cross-linked | 9.74 |
| Solution Visc. (cps) | 1,890 | 1,100 | 1,500 | 5,490 | 1,580 |

After observing some problems with high viscosity and cross-linking, Polymer #5 was made with lower overall molecular weight as well as adjusting the I/B ratio to 60/40. Step II Pk refers to the number average molecular weight of the AB diblock prior to coupling. Polymer #5 had the highest MFR that is more in line with radial polymers used in extruder hot melt pressure sensitive adhesive (HMPSA) tape lines. GPC analysis revealed the following about each of the Polymers #1-5:

| | Peak area (%) from GPC | | | | |
|---|---|---|---|---|---|
| | Polymer #1 | Polymer #2 | Polymer #3 | Polymer #4 | Polymer #5 |
| IV | 8 | 10 | 12 | 36 | 7 |
| III | 66 | 52 | 59 | 33 | 57 |
| II | *3-5 | *3-5 | *3-5 | *3-5 | *3-5 |
| I | 24 | 35 | 24 | 24 | 27 |

*estimated due to peak overlap in GPC between peak III and peak II

Pressure Sensitive Adhesive Properties

As suggested from earlier work, these radial polymers had good compatibility with Wingtack ET tackifier. Wingtack ET is a solid tackifying resin with about 15% aromatic proton content and a $T_g$ of 44° C.

A summary of PSA performance is shown in Table 2. Polymer #2 and #5 stand out as the best overall performers. It was surprising that the low-coupled Polymer #2 had the best PSA performance, particularly in the SAFT test. Compared to radial polymers with only isoprene in the midblock, these polymers had better PSA properties. It is known in the art that high diblock (over 20%) content acts to erode the strength/shear performance of adhesive formulations. As shown in the examples, Polymers #2 and #5 have high diblock content, high SAFT temperatures and melt flow rates exceeding 7.0 g/10 min.

Viscosity-Aging of Formulations

Viscosity-aging performance for Polymers #2 and #5 appeared to behave like SI radial polymers except the rate of chain scission was lower.

TABLE 2

PSA Properties of Radial (S – I/B) x Polymers

| | Polymer Number | | | | | |
|---|---|---|---|---|---|---|
| | #1 | #2 | #3 | #4 | #5 | #7 |
| Monomer Blend I/B % | 50/50 | 70/30 | 70/30 | 30/70 | 60/40 | Isoprene only |
| Actual Coup. % | 75.8 | 63.2 | 74 | 82.6 | 71 | |
| Melt Index (200 C./5 kg) | Cross-linked | 7 | 2 | Cross-linked | 9.74 | |
| Formulation No. | F-1 | F-2 | F-3 | F-4 | F-5 | F-6 |
| Composition, phr | | | | | | |
| Polymer #1 | 100 | | | | | |
| Polymer #2 | | 100 | | | | |
| Polymer #3 | | | 100 | | | |
| Polymer #4 | | | | 100 | | |
| Polymer #5 | | | | | 100 | |
| Polymer #7 | | | | | | 100 |
| WINGTACK ET | 110 | 110 | 110 | 110 | 110 | |
| Piccotac 95 | | | | | | 120 |
| SHELLFLEX 371 | 15 | 15 | 15 | 15 | 15 | 30 |
| Irganox 1010 | 3 | 3 | 3 | 3 | 3 | 1 |
| Rolling Ball Tack (cm) | 4.4 | 2.6 | 3.3 | 15.1 | 5.8 | 4.8 |
| Polyken Probe (kg) | 1.6 | 1.8 | 1.7 | 0.7 | 1.4 | 1.5 |
| Loop Tack (oz/in) | 105 | 120 | 110 | 41 | 120 | 101 |
| 180 Peel (pli) | 4.4 | 4.6 | 4.6 | 4.6 | 2 | 6.1 |
| 180 Peel Failure | Adhesive | Adhesive | Adhesive | Ghosting | Adhesive | Adhesive |
| HP Steel (min), 2 kg | >10,000 | >10,000 | >10,000 | >10,000 | >10,000 | >10,000 |
| HP Kraft (min), 2 kg | 2800 | >10,000 | 2870 | 1495 | 5620 | 8,683 |
| SAFT Mylar (° C.)0.5 kg | 88 | 97 | 93 | 102 | 85 | 90 |

What is claimed is:

1. A block copolymer composition comprising:
   a. a tetra-branched block copolymer (IV) represented by the general formula $(A-B)_4X$;
   b. a tri-branched block copolymer (III) represented by the general formula $(A-B)_3X$;
   c. a di-branched block copolymer (II) represented by the general formula $(A-B)_2X$; and
   d. a linear diblock copolymer (I) represented by the general formula A-B; where:
      i. A represents a polymer block of a mono alkenyl arene;
      ii. B represents a polymer block of a mixture of isoprene and 1,3-butadiene having a random distribution in a weight ratio of isoprene to butadiene from 70:30 to 40:60;
      iii. X represents the residue of a multi-functional coupling agent selected from silicon halides, siloxanes, epoxy alkoxysilanes, esters of monohydric alcohols with carboxylic acids, epoxidized oils, epoxides and divinylaromatics;
      iv. the weight percent of A blocks is from 14% to 22%;
      v. the relative amounts of copolymers IV, III, II, and I are from 0 to 20 weight percent IV, from 50 to 80 weight percent III, from 0 to 20 weight percent II and from 20 to 50 weight percent I, where the total of I, II, III and IV equals 100 weight percent; and
      vi. the melt flow rate of the polymer composition is at least 2.0 g/10 minutes at 200° C./5 kg as measured by ASTM D1238 (D condition).

2. The block copolymer composition of claim 1 wherein said mono alkenyl arene is styrene.

3. The block copolymer composition of claim 2 wherein said block B has a glass transition temperature (Tg) less than −50° C. as determined according to ASTM E-1356-98.

4. The block copolymer composition of claim 3 wherein said multi-functional coupling agent is selected from the group comprising silicon halides, siloxanes, alkoxysilanes, epoxy alkoxysilanes, esters of monohydric alcohols with carboxylic acids, epoxidized oils, epoxides and divinylaromatics.

5. The block copolymer composition of claim 4 wherein each block A has a weight average molecular weight of 5,000 to 17,000 and each B block has a weight average molecular weight of 50,000 to 100,000.

6. The block copolymer composition of claim 5 wherein:
   a. the relative amounts of copolymers IV, III, II, and I are from 1 to 15 weight percent IV, from 50 to 70 weight percent III, from 1 to 10 weight percent II and from 30 to 50 weight percent I, where the total of I, II, III and IV equals 100 weight percent; and
   b. the weight ratio of isoprene to butadiene in each block B is from 60:40 to 50:50.

7. The block copolymer composition of claim 6 wherein the weight percent styrene is from 15% to 21%.

8. The block copolymer composition of claim 7 wherein the melt flow rate is greater than or equal to 5.0 g/10 min as measured by D1238 (D condition).

9. The block copolymer composition of claim 7 wherein the coupling agent residue (X) is formed from glycidoxy propyl trimethoxy silane (GPTS), or tetramethoxysilane.

10. An adhesive composition comprising (i) one or more block copolymers, (ii) one or more tackifying resins, and (iii) optionally, one or more plasticizers, wherein at least one of the block copolymers is a block copolymer composition comprising:
   a. a tetra-branched block copolymer (IV) represented by the general formula $(A-B)_4X$;
   b. a tri-branched block copolymer (III) represented by the general formula $(A-B)_3X$;
   c. a di-branched block copolymer (II) represented by the general formula $(A-B)_2X$; and
   d. a linear diblock copolymer (I) represented by the general formula A-B; where:
      i. A represents a polymer block of a mono alkenyl arene;
      ii. B represents a polymer block of a mixture of isoprene and 1,3-butadiene having a random distribution in a weight ratio of isoprene to butadiene from 70:30 to 40:60;
      iii. X represents the residue of a multi-functional coupling agent selected from silcon halides, siloxanes, epoxy alkoxysilanes, esters of monohydric alcohols with carboxylic acids, epoxidized oils, epoxides and divinylaromatics;
      iv. the weight percent of A blocks is from 14% to 22%;
      v. the relative amounts of copolymers IV, III, II, and I are from 0 to 20 weight percent IV, from 50 to 80 weight percent III, from 0 to 20 weight percent II and from 20 to 50 weight percent I, where the total of I, II, III and IV equals 100 weight percent; and
      vi. the melt flow rate of the polymer composition is at least 2.0 g/10 minutes at 200° C./5 kg as measured by ASTM D1238 (D condition).

11. The adhesive composition of claim 10 wherein said tackifier resin has an aromaticity (in relative percentage of aromatic protons as determined by H—NMR)of from 3 to 18%.

12. The adhesive composition of claim 11 where said adhesive composition comprises 100 parts by weight of said block copolymer composition and 50 to 400 parts by weight of said tackifier resin.

13. The adhesive composition of claim 12 also containing 5 to 150 parts by weight of a plasticizer.

14. The adhesive composition of claim 12 wherein said mono alkenyl arene is styrene.

15. The adhesive composition of claim 14 wherein said block B has a glass transition temperature (Tg) less than −50° C. as determined according to ASTM E-1356-98.

16. The adhesive composition of claim 15 wherein each block A has a weight average molecular weight of 5,000 to 17,000 and each B block has a weight average molecular weight of 50,000 to 100,000.

* * * * *